June 1, 1954  J. A. JOHNSON  2,679,721
HAY RAKE TOOTH MOUNTING
Filed June 11, 1951
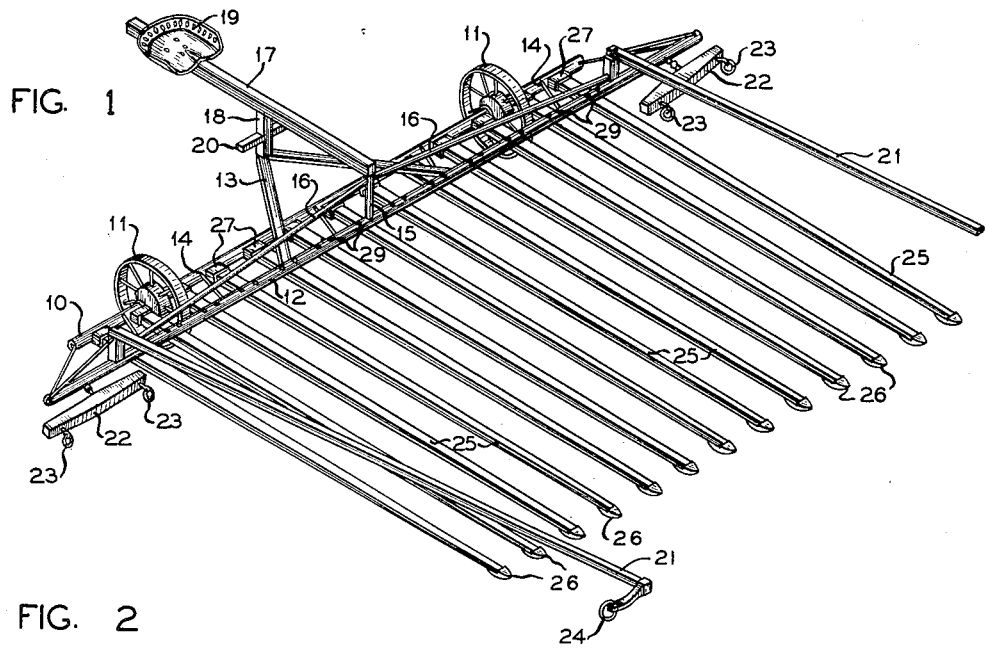
FIG. 1
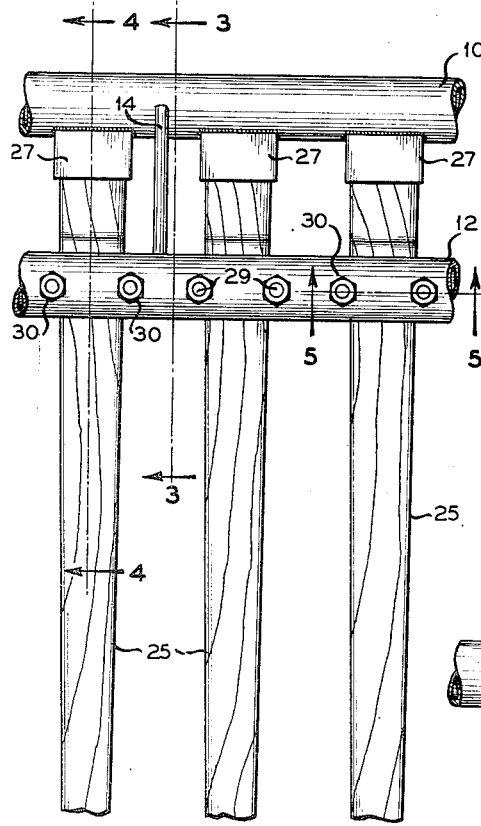
FIG. 2
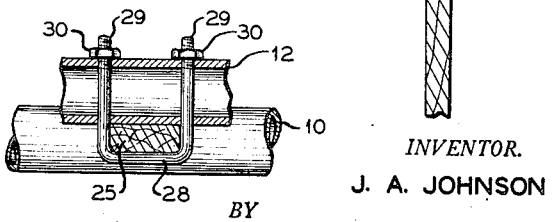
FIG. 5
FIG. 3
FIG. 4
INVENTOR.
J. A. JOHNSON
BY A. Yates Dowell
ATTORNEY Patented June 1, 1954

2,679,721

UNITED STATES PATENT OFFICE 2,679,721

HAY RAKE TOOTH MOUNTING

Joseph A. Johnson, Evanston, Wyo.

Application June 11, 1951, Serial No. 230,947

1 Claim. (Cl. 56—400)

This invention relates to agriculture and more particularly to apparatus for gathering and transporting cut hay or other vegetation and commonly known in the art as a sweep rake.

Agricultural apparatus of this general description has been well known for many years and the present invention is intended to overcome some of the more troublesome problems which have been encountered in the past. Generally speaking devices of this nature incorporate an axle on which are journalled ground engaging wheels for supporting the device and to this axle is secured a frame for carrying the various elements of the rake. It has also been common practice to utilize teeth which comprise elongated wooden members extending forwardly of the apparatus, these teeth engaging the ground and receiving the hay or other vegetation on the upper surface thereof. The hay may either be removed from the teeth or rake and transferred to a vehicle for transportation or in certain types of sweep rakes the teeth may be raised from the ground and the hay transported by the rake itself.

The chief source of difficulty in rakes of this type has been the tendency for the wooden teeth to break and much time and effort has been expended in replacing these broken teeth. Such teeth have normally been held in place by bolts extending through the material of the tooth itself and needless to say the holes necessary to accommodate these bolts materially weaken the teeth as evidenced by the fact that breakage most often occurs at the location of these holes. Needless to say any improvement which results in less breakage of the teeth and when such teeth do break facilitates the quick and easy replacement thereof is an advantage and a step forward in the art. Such tooth structure has also been heretofore been utilized in stackers or loaders in which hay or other cut vegetation is raised and deposited on the top of a stack and the present invention contemplates improvement in this type of apparatus as well. For the purpose of illustration in this application, a sweep rake is shown but this is to be considered as illustrative only and not as in any way limiting the invention to use only with a sweep rake.

It is accordingly an object of the invention to provide an agricultural implement in the nature of a sweep rake which is of relatively simple and economical construction and which provides for the utmost strength and durability in the teeth of such rake.

It is a further object of the invention to provide an agricultural implement of the nature of a sweep rake in which the fastening means for securing the elongated wooden teeth of the rake in position on the frame precludes the necessity for providing holes in the teeth yet securely fixes these teeth in position and in the event of breakage materially facilitates the replacement thereof.

It is a further object of the invention to provide an agricultural implement in the nature of a sweep rake in which the means provided for securing the elongated teeth of the rake in position facilitates quick and easy replacement thereof, and which means is equally applicable to all types of such rakes as well as to loaders and stackers.

Further objects and advantages of the invention will be apparent from the following description taken in conjunction with the accompanying drawings, wherein:

Fig. 1 is a view in perspective showing a sweep rake incorporating this invention;

Fig. 2 is an enlarged fragmentary plan view showing the details of the means for securing the elongated teeth of the rake in position;

Fig. 3 is a sectional view on the line 3—3 of Fig. 2;

Fig. 4 is a sectional view similar to Fig. 3 but taken on the line 4—4 of Fig. 2; and Fig. 5 is a fragmentary sectional view taken on the line 5—5 of Fig. 2 and showing further details of the tooth securing means.

With continued reference to the drawing there is shown in Fig. 1 a sweep rake which is generally of conventional construction and which comprises an axle 10 upon which are journalled for rotation ground engaging wheels 11, these wheels serving to support the device during movement over the ground. Forwardly of the axle 10 and extending generally parallel thereto is a transverse frame member in the form of a tube 12 which may be secured to the axle 10 by frame members 13 and tie bars 14. Tie bars 14 as shown in Figs. 2 and 3 may be secured to the axle 10 and transverse frame member 12 by welding or the like. Transverse frame member 12 is strengthened by means of a truss like structure comprising a central upstanding member 15 and transversely disposed bars 16 which are secured at their ends to the outer ends of the transverse frame member 12.

A rearwardly extending centrally disposed bar 17 is secured to the upstanding member 15 and to a prop 18 secured to the rearwardly extending frame members 13, bar 17 carrying an operator's seat 19 and there being provided a foot rest in a form of a cross bar 20 secured to the prop 18.

The rake as shown in Fig. 1 is intended to be horsedrawn although of course the same may be adapted to towing by a tractor or other vehicle but for the purposes of illustration there is shown a pair of forwardly extending poles or tongues 21 connected at their rear ends to the cross frame member 12 there also being a whiffletree 22 pivotally secured to the cross frame member 12 adjacent each end thereof. Each whiffletree 22 is provided with rings 23 for engaging the traces attached to the harness of the horse. The forward end of pole or tongue 21 is provided with a ring 24 for engagement by the hold back strap secured to the harness of the horse.

The teeth 25 of the rake comprise forwardly extending elongated members constructed of wood or other suitable material and the forward ends of these teeth are protected by metallic shoes or caps 26 which serve to engage the ground and protect the teeth 25 from breakage when encountering stones or other obstructions.

With particular reference to Figs. 2 to 4 the axle 10 is provided with a plurality of sockets or cups 27 secured to the forward surface thereof by welding or the like these sockets serving to receive the rear ends of the teeth 25. The teeth 25 extend forwardly from the sockets 27 below the cross frame member 12 and in order to secure the teeth firmly in position a U-bolt extends around the sides and lower surface of the tooth 25 and upwardly through apertures in the cross frame member 12. The upper ends 29 of the U-bolt 28 are threaded to receive nuts 30 although other equivalent fastening means may be utilized. As will be seen from an inspection of the drawing it is only necessary to tighten the nuts 30 securely against the upper surface of the cross frame member 12 to clamp the tooth 25 against the lower surface thereof and securely hold the same in position. Such a fastening means precludes the necessity of providing holes through the teeth 25 thus retaining the entire strength of the material thereof and also upon removing broken teeth for replacement it is only necessary to loosen the two nuts 30 on each U-bolt and slip the broken portion of the tooth out of the socket 27 putting a new one in place and replacing the U-bolt 28.

It will thus be seen that there has been provided by this invention a very simple and fool proof manner of securing the teeth of sweep rakes in position and one which facilitates replacement of broken teeth and at the same time retains the full strength of the material from which the teeth are made.

It will be obvious to those skilled in the art that various changes may be made in the invention without departing from the spirit and scope therefore the invention is not limited by that which is shown in the drawings and described in the specification but only as indicated in the appended claim.

What is claimed is:

A rake comprising an axle, ground engaging supporting members disposed in spaced relation on said axle, a transverse frame member disposed forwardly of said axle, relatively short tie bars directly connecting said frame member and said axle, relatively shallow sockets disposed lengthwise in spaced relation along the front of said axle for removably receiving and taking the thrust on the rear ends of rake teeth, rake teeth disposed transversely on said frame member and having their rear ends disposed in said sockets, U-shaped clamps securing the rear ends of said teeth in said sockets and the intermediate portions of said teeth to said transverse frame member.

References Cited in the file of this patent
UNITED STATES PATENTS

| Number | Name | Date |
| --- | --- | --- |
| 857,412 | Nelson | June 18, 1907 |
| 1,269,393 | Cope | June 11, 1918 |
| 1,640,031 | Elmore | Aug. 23, 1927 |
| 2,479,753 | Luomala | Aug. 23, 1949 |
| 2,530,656 | Fall | Nov. 21, 1950 |